US007040535B2

(12) United States Patent
Sato et al.

(10) Patent No.: US 7,040,535 B2
(45) Date of Patent: May 9, 2006

(54) VENDING MACHINE

(75) Inventors: Masaaki Sato, Ohta (JP); Kuniyuki Tokizawa, Isesaki (JP); Yuji Sone, Takasaki (JP); Junichi Nishio, Gyoda (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 11/033,305

(22) Filed: Jan. 12, 2005

(65) Prior Publication Data

US 2005/0150948 A1 Jul. 14, 2005

(30) Foreign Application Priority Data

Jan. 13, 2004 (JP) ............................ 2004-005507

(51) Int. Cl.
*G06F 7/08* (2006.01)

(52) U.S. Cl. ........................ 235/381; 235/383; 221/11

(58) Field of Classification Search ........ 235/381–383, 235/375; 221/6, 11, 14, 17
See application file for complete search history.

(56) References Cited

U.S. PATENT DOCUMENTS

| | | | | |
|---|---|---|---|---|
| 5,050,769 | A * | 9/1991 | Levasseur | 221/1 |
| 2003/0125836 | A1 * | 7/2003 | Chirnomas | 700/236 |
| 2003/0146233 | A1 * | 8/2003 | Chirnomas | 221/123 |
| 2004/0232227 | A1 * | 11/2004 | Kusakawa | 235/381 |

FOREIGN PATENT DOCUMENTS

| | | |
|---|---|---|
| JP | 04007692 A * | 1/1992 |
| JP | 09-293166 | 11/1997 |
| JP | 10-198853 | 7/1998 |
| JP | 11-232537 | 8/1999 |

* cited by examiner

*Primary Examiner*—Thien M. Le
*Assistant Examiner*—Edwyn Labaze
(74) *Attorney, Agent, or Firm*—Banner & Witcoff, Ltd.

(57) ABSTRACT

When any one of the commodities displayed in commodity image display areas is sold out during an operation of a vending machine, a substitute commodity for a sold-out commodity is selected from among commodities other than the sold-out commodity, and a display of a commodity image display area including the sold-out commodity is replaced with a display of a commodity image display area including a commodity image of the selected substitute commodity.

8 Claims, 9 Drawing Sheets

VENDING MACHINE

BACKGROUND OF THE INVENTION (i) Field of the Invention

The present invention relates to a vending machine for selling a canned beverage, a bottled beverage, a plastic-bottled beverage, etc., and more specifically to a vending machine having a display for displaying an image on a surface to purchasers.

(ii) Description of the Related Art

A typical vending machine for selling commodity such as a canned beverage, a bottled beverage, a plastic-bottled beverage, etc. has a display such as a liquid crystal display, etc. for displaying an image on a surface to purchasers. The vending machine has a touch sensor on a surface of the display in place of conventional button switches, displays a plurality of commodity images (including added data such as commodity prices, temperature characters, etc.) indicating dispensable commodities on the display in place of conventional commodity samples, and performs-predetermined sales of commodities by detecting a touch of a predetermined commodity image by means of the touch sensor.

With the vending machine, an operation relating to exchanges or position changes of commodity samples in the conventional vending machine can be easily performed by setting and changing the kind and position of the commodity images displayed on the display.

With this type of the vending machine, when commodities are sold out during an operation, the commodity images of sold-out commodities are cleared on the display. However, in the method of clearing the commodity images corresponding to sold-out commodities from the display, the commodity images are cleared as if it were lost. Thereby, giving a bad impression to the purchasers when the purchasers see the display, and lowering an appetite for shopping because there are a smaller number of displayed commodity images.

SUMMARY OF THE INVENTION

An object of the present invention is to prove a vending machine capable of replacing a commodity image corresponding to a sold-out commodity with a commodity image of a substitute commodity when a commodity is sold out, and therefore preventing purchasers from having a bad impression from a display.

In order to achieve the object, the vending machine according to the present invention includes: commodity image display means for displaying on a display a plurality of commodity images indicating dispensable commodities; commodity image replacement means for replacing a commodity image corresponding to a sold-out commodity with a commodity image of a substitute commodity when a commodity is sold out; and substitute commodity selection means for performing plural times under different conditions a weighting process of assigning a point to commodity extracted under a predetermined retrieval condition from among the commodities other than the sold-out commodity, and selecting a commodity having a highest total points as the substitute commodity.

With this vending machine, since the commodity image corresponding to the sold-out commodity is replaced with the commodity image of the substitute commodity when the commodity is sold out, the commodity image is not cleared as if it were lost. Therefore, a purchaser can be protected from receiving a bad impression when the purchaser sees the display. Additionally, when the substitute commodity is selected, the weighting process of assigning the point to the commodity extracted under the predetermined retrieval condition from among commodities other than the sold-out commodity is performed plural times under different conditions, and the commodity having the highest total points is selected as the substitute commodity. Therefore, the optimum commodity as the substitute commodity can be selected and this commodity image can be displayed, thereby enhancing the salability of the vending machine.

The above-mentioned and other objects, features, and effects of the present invention are will be apparent by the following explanation and the attached drawings.

DESCRIPTION OF THE PREFERRED EMBODIMENTS

FIGS. 1 to 9 show embodiments of the present invention.

Figure 1:
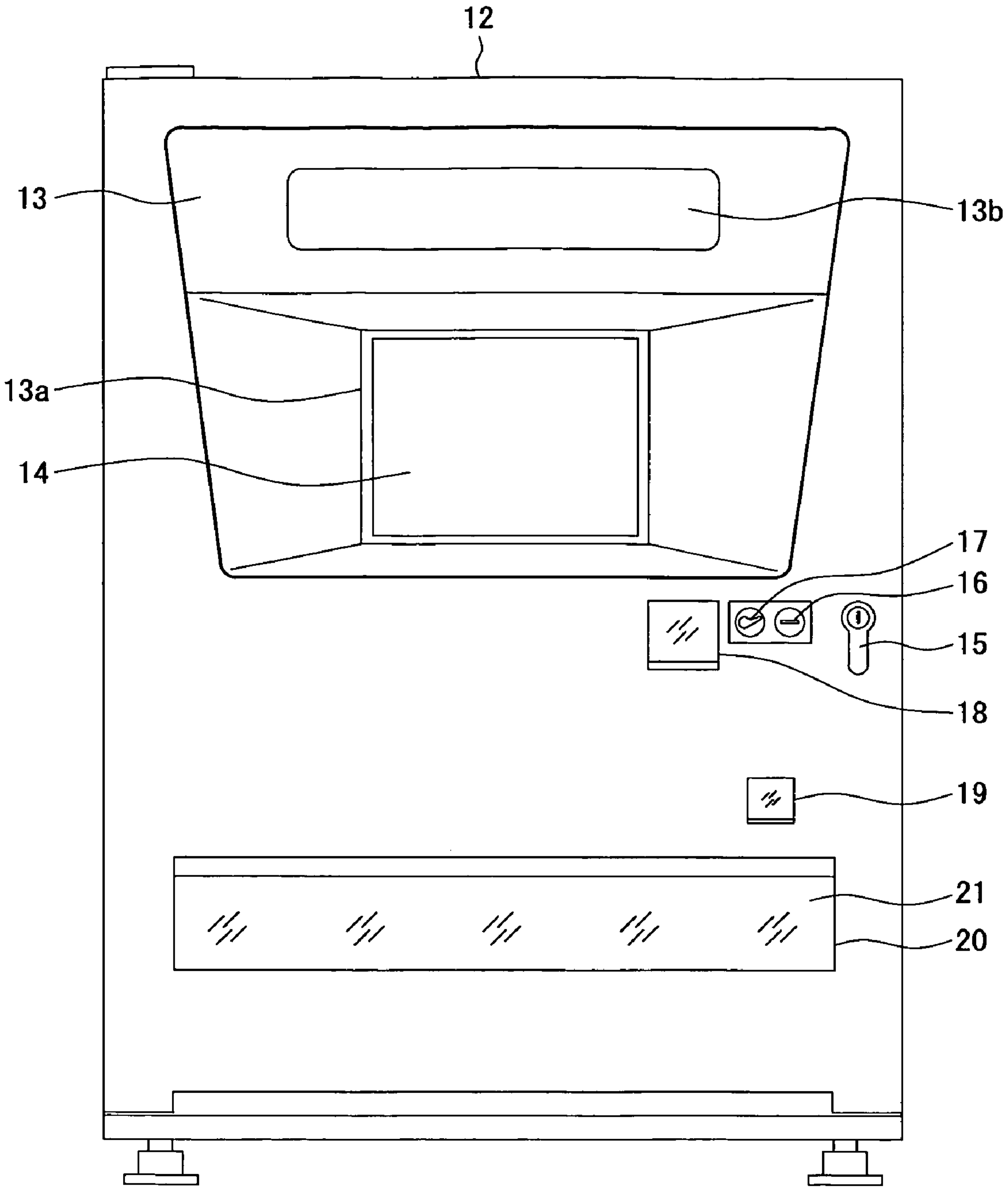
FIG. 1 is a front view of a vending machine according to an embodiment of the present invention.
Figure 2:
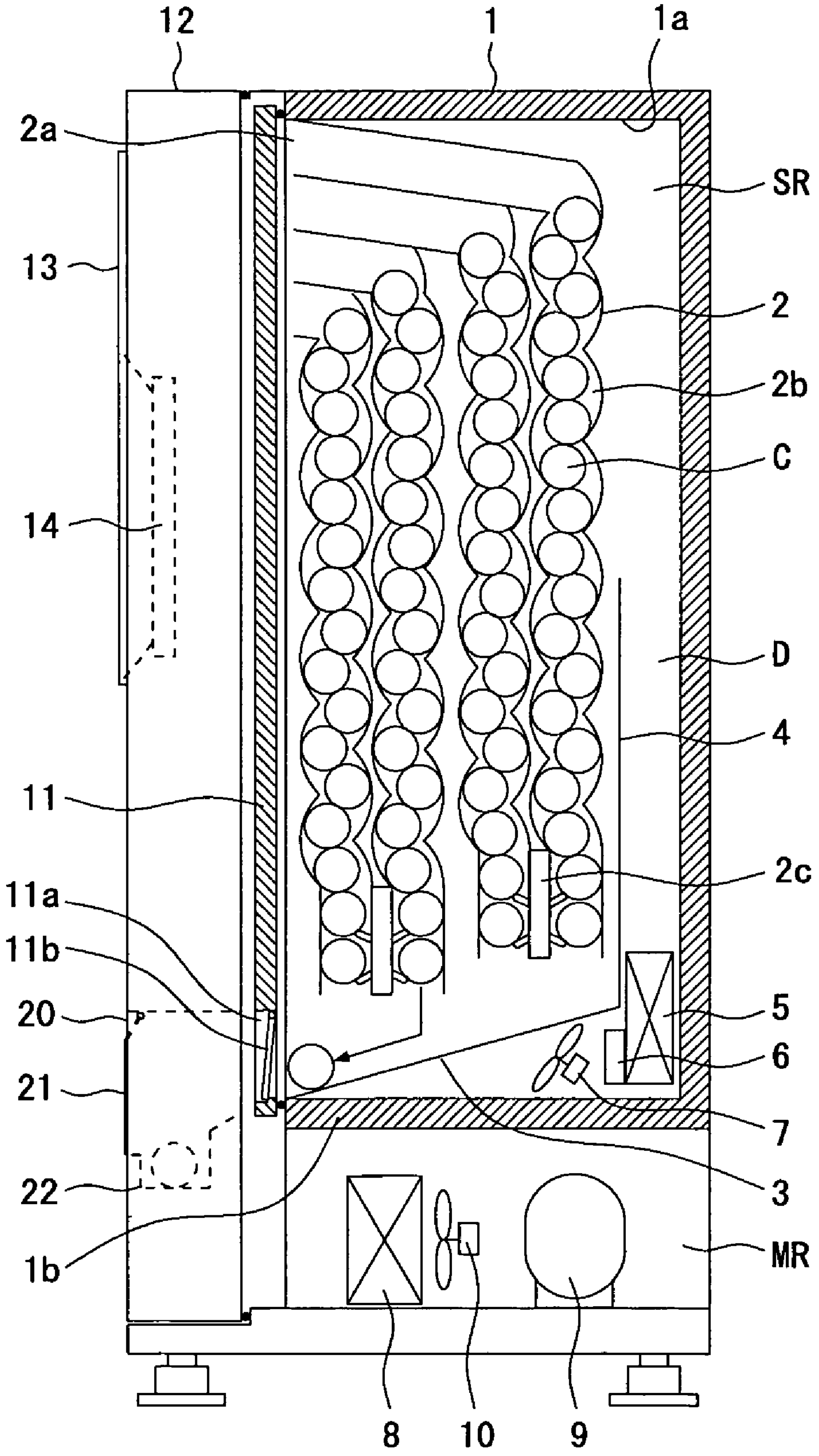
FIG. 2 is a side sectional view of the vending machine shown in FIG. 1.

First, a structure of a vending machine is explained by referring to FIGS. 1 and 2. In this explanation, frontward in FIG. 1 is described as "front", backward is described as "back", the left side is described as "left", and the right side is described as "right".

A cabinet 1 is a box having an aperture on the front, and includes an insulative inner case 1*a* having an aperture on the front. The space in the inner case 1*a* functions as a commodity storage chamber (not assigned a reference numeral). The commodity storage chamber is partitioned into a plurality of unit chambers SR arranged side by side by insulative partitioners (not shown in the attached drawings).

In the each unit chamber SR, a commodity storage rack 2 comprising a serpentine rack is arranged. The commodity storage rack 2 has a commodity replenishment aperture 2*a* at the upper portion on the front, and stores commodities C such as a canned beverage, a bottled beverage, a plastic-bottled beverage, etc. with one laid on the other on their sides in a serpentine storage path 2*b*. At the lower portion of the commodity storage rack 2, a vent mechanism 2*c* for dropping and outputting one by one the stored commodities C onto a shoot plate 3. Furthermore, a sold-out commodity detection sensor 2*d* (see FIG. 3) for detection of presence/absence of the commodity C for the storage path 2*b* is provided for the each commodity storage rack 2 arranged for the each unit chamber SR. The commodity storage rack 2 is not limited to the serpentine rack, but can be any rack capable of delivering stored commodities one by one as in the serpentine rack.

In the each unit chamber SR, there are the shoot plate 3 and a duct plate 4 from the bottom to the back. In the space at the lower portion and on the back of the shoot plate 3 and the duct plate 4, an evaporator 5 in the freezing mechanism configuring equipment, an electric heater 6, a cooling/heating air circulation fan 7, etc. are provided, and the space on the back of the duct plate 4 is configured as a duct D. In the each unit chamber SR, a temperature sensor (not shown in the attached drawings) for detecting a temperature of commodity to be taken out soon in the each commodity storage rack 2 is provided.

A machine chamber MR is provided below a bottom plate 1$b$ of the inner case 1$a$, and a condenser 8, a compressor 9 and an expanding means (not shown in the attached drawings) in the freezing mechanism configuring equipment, a heat exchange fan 10, etc. are arranged in the machine chamber MR.

On the front side of the inner case 1$a$, an insulative inner door 11 covers the front aperture and can be opened and closed. At the front end portions of the upper, lower, left, and right portions of the inner case 1$a$ (the front end portion of the lower portion meets a front end portion of the bottom plate 1$b$) and at the front end portion of the each partitioning plate, a gasket (not assigned a reference numeral) is provided to keep a commodity storage chamber (each unit chamber SR) in an airtight state with the inner door 11 closed. Each unit chamber SR configures an independent insulative chamber with the inner door 11 closed. Furthermore, below the inner door 11, a plurality of window holes 11$a$ corresponding to the shoot plate 3 of the each unit chamber SR are formed, and the each window hole 11$a$ is provided with a flap door 11$b$ opened by the commodity C slipping down on the shoot plate 3.

That is, with the vending machine, the each unit chamber SR configures an independent insulative chamber, and the each unit chamber SR is provided with the evaporator 5 and the electric heater 6 independently. Therefore, a thermoregulation setting unit 31 (FIG. 3) described later optionally selects and enter one of three modes including a cooling mode, a warming mode, and a non cooling/warming mode for the each unit chamber SR.

An outer door 12 is provided for the aperture on the front of the cabinet 1 so that it can be opened and closed. A decorative panel 13 is provided at the upper portion on the surface of the outer door. The decorative panel 13 comprises a rectangular window hole 13$a$ for exposure of a liquid crystal display 14 and an advertising unit 13$b$ for display of a name of a manufacturer of the commodities, a name of the commodity, etc. by characters.

The liquid crystal display (hereinafter referred to as an LCD) 14 displays color still and moving images, and a surface of the LCD 14 is arranged inside the decorative panel 13 so that it can be exposed from the window hole 13$a$. The LCD 14 can be replaced with a well known display for similar display, for example, a CRT (cathode ray tube) display, a PDP (plasma display panel), etc.

Although omitted in FIGS. 1 and 2, on the surface of the LCD 14, a touch sensor 34 (see FIG. 3) for detection of touching coordinates by a finger is provided. In addition to well known a static transparent touch panel or a pressure sensitive transparent touch panel can be used in place of the touch sensor 34, and light emitting devices and light receiving devises forming a infrared sensors are arranged at equal intervals at upper, lower, left and right sides of a rectangular frame can be used.

Also on the front side of the outer door 12, a locking operation lever 15, a coin insert slot 16, a return lever 17, a banknote insert slot 18, a coin return pocket 19, and a commodity reception pocket 20 are mounted with the layout as shown in FIG. 1. The locking operation lever 15 operates a lock mechanism (not shown in the drawings) provided in the outer door 12, and is available using a dedicated key. The commodity reception pocket 20 is provided with a flap door 21 which can be manually opened, and in which a commodity reception plate 22 is mounted and receives the commodity C ejected from the flap door 11$b$.

Figure 3:
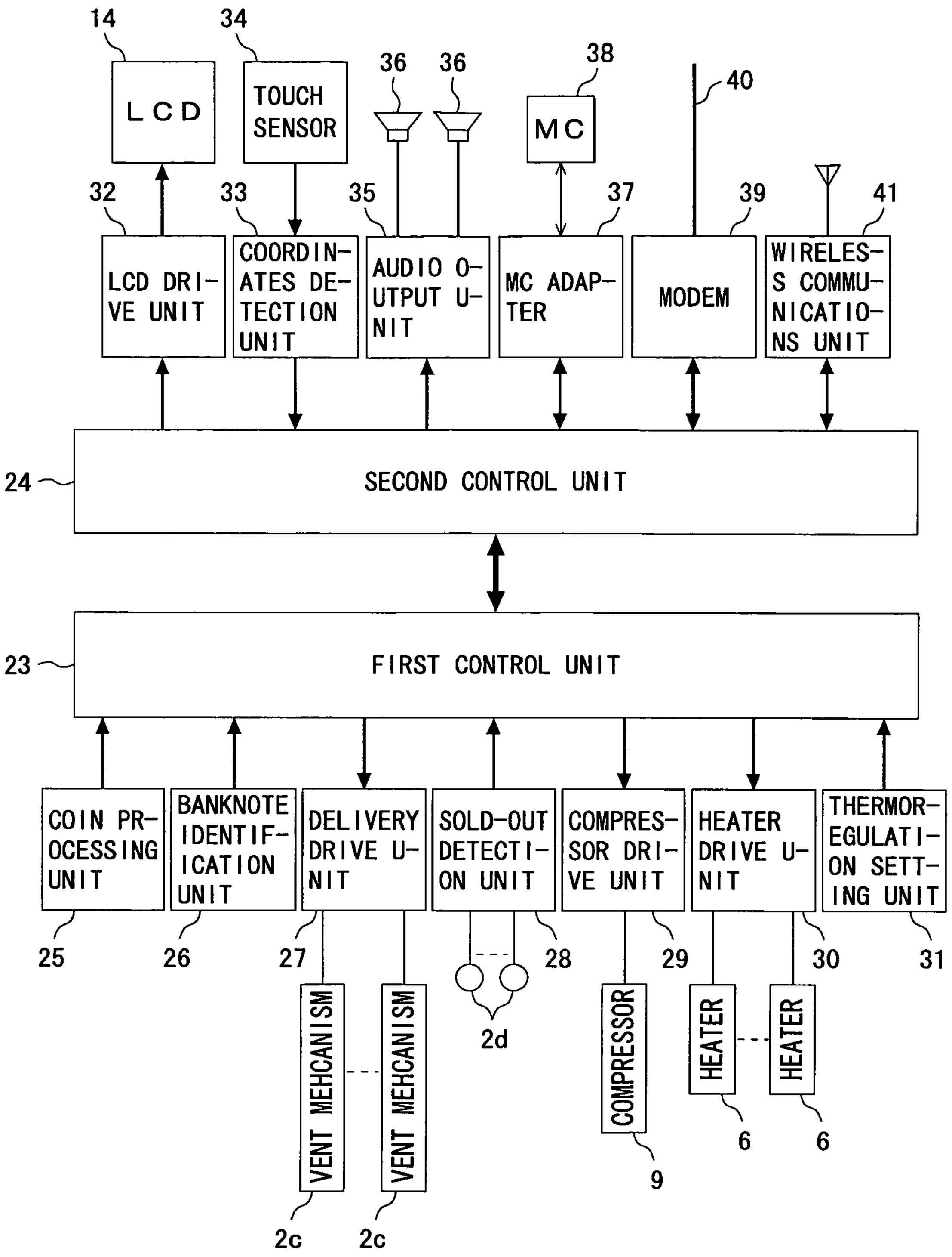
FIG. 3 is a block diagram showing a configuration of a control system of the vending machine shown in FIGS. 1 and 2.

Next, a configuration of a control system of the vending machine shown in FIGS. 1 and 2 is explained by referring to FIG. 3.

A first control unit 23 mainly controls thermoregulation and delivery of the commodity C. A second control unit 24 mainly controls the display of the LCD 14 and communications of data with an external device. The control units 23 and 24 comprise a computer having a CPU, a RAM, a ROM, etc. so that necessary data in control can be exchanged among them. The first control unit 23 and the second control unit 24 can be configured by one computer.

A coin processing unit 25, a banknote identification unit 26, a delivery drive unit 27, a sold-out detection unit 28, a compressor drive unit 29, a heater drive unit 30, and a thermoregulation setting unit 31 are connected to the first control unit 23. Also, a temperature sensor (not shown in the attached drawings) for detecting a temperature of the commodity to be taken out soon in the each commodity storage rack 2 are connected is connected to the first control unit 23 through a temperature detection unit (not shown in the attached drawings).

The coin processing unit 25 and the banknote identification unit 26 are arranged in the outer door 12, and the coin processing unit 25 authenticates, counts, and stores coins inserted through the coin insert slot 16, and transmits a data about an amount of inserted coins to the first control unit 23. The banknote identification unit 26 authenticates and stores a banknote inserted through the banknote insert slot 18, and transmits a data about a inserted banknote to the first control unit 23.

The delivery drive unit 27 controls an operation of the vent mechanism 2$c$ provided in the each commodity storage rack 2, that is, the operation of the actuator of a solenoid, etc. used in the vent mechanism 2$c$, and operates a predetermined vent mechanism 2$c$ according to a control signal from the first control unit 23 and delivers a predetermined commodity C.

The sold-out detection unit 28 transmits a data about sold-out commodity to the first control unit according to a detection signal of the sold-out detection sensor 2$d$ provided for the storage path 2$b$ of the each commodity storage rack 2.

The compressor drive unit 29 controls an operation of the compressor 9, that is, the operation of a motor for driving the compressor 9, and performs a desired compressor drive according to a control signal from the first control unit 23.

The heater drive unit 30 controls a power supply to the electric heater 6, and supplies power to a predetermined electric heater 6 according to a control signal from the first control unit 23.

The thermoregulation setting unit 31 for selecting one of the three modes for the each unit chamber SR is provided with button switches, etc. for selecting the mode, and outputs a data about a selected mode to the first control unit 23.

A LCD drive unit 32, a coordinates detection unit 33, an audio output unit 35, a memory card adapter (hereinafter referred to as an MC adapter) 37, a modem 39, and a wireless communications unit 41 are connected to the second control unit 24.

The LCD drive unit 32 controls the display of the LCD 14 provided on the outer door 12, drives the LCD 14 according to an image data and a control signal from the second control unit 24, and displays a predetermined image.

The coordinates detection unit 33 transmits a data about the coordinates according to a detection signal of a touch sensor 34 to the second control unit 24.

The audio output unit 35 drives speakers 36 according to an audio signal and a control signal from the second control unit 24, and performs predetermined audio output. At least one speaker 36 arranges on both sides of the LCD 14 in the outer door 12 so that a stereo acoustic effect can be obtained by a stereo system.

The MC adapter 37 enables a memory card (hereinafter referred to as an MC) 38 to be connected. The modem 39 uses a public telephone circuit 40, etc. and communicates data with an external server, etc., and the wireless communications unit 41 uses a mobile telephone network, a PHS telephone network, etc., and communicates a data by wireless with an external server, etc.

An image data including still images, moving images, etc. and a character data which can be displayed on the LCD 14 and an audio data output from the speakers 36 can be fetched in the storage means such as a hard disk, etc. provided for the second control unit 24 in the data communications through the MC 38 and the modem 39, and the wireless communications unit 41, and the data can be arbitrarily updated. The image data, the character data, and the audio data each include display images (including commodity images, etc.), and display characters, output voices, etc. when a sales image described later is displayed.

Figure 4:
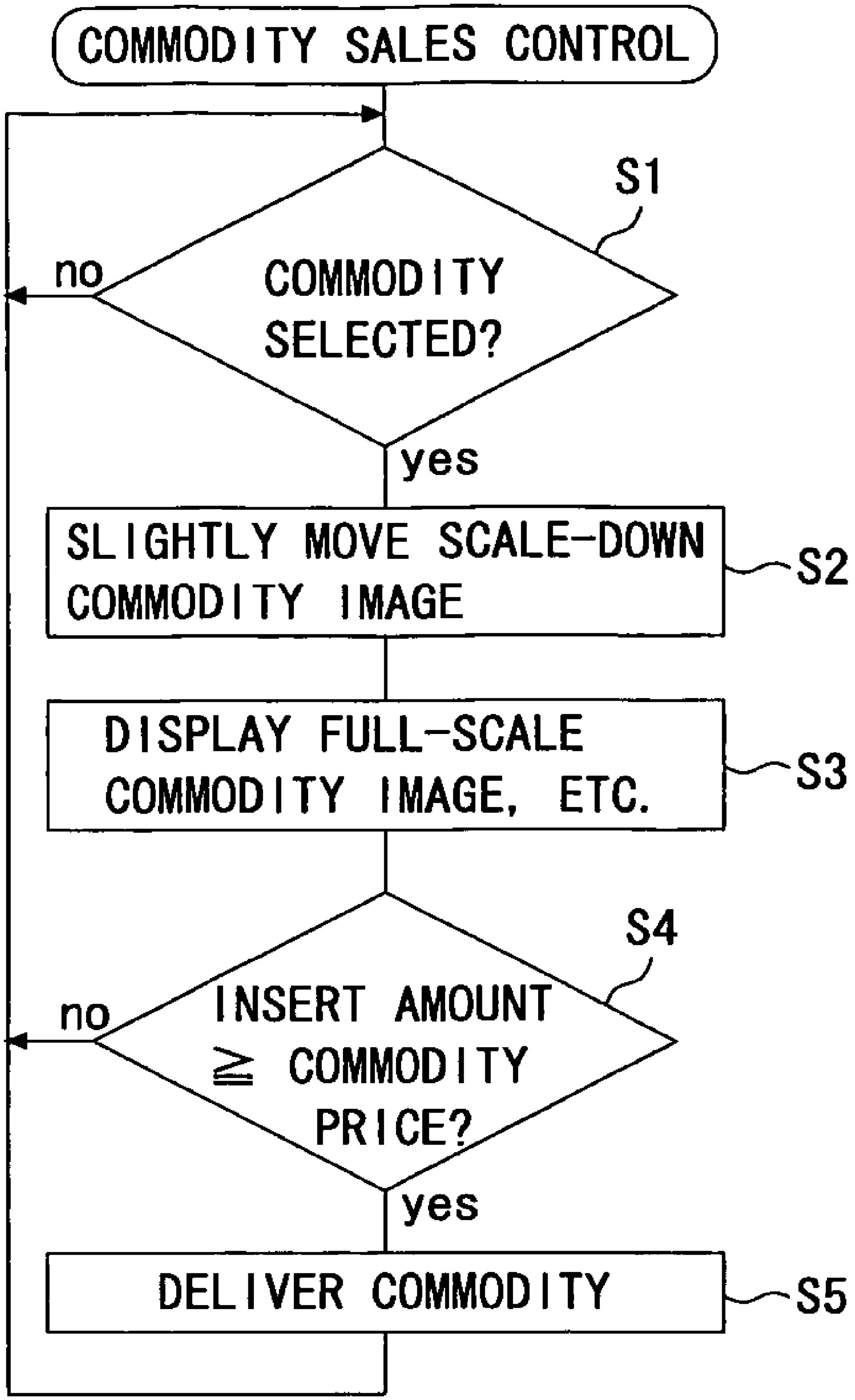
FIG. 4 is a flowchart of a commodity sales operation of the vending machine shown in FIGS. 1 and 2.
Figure 5:
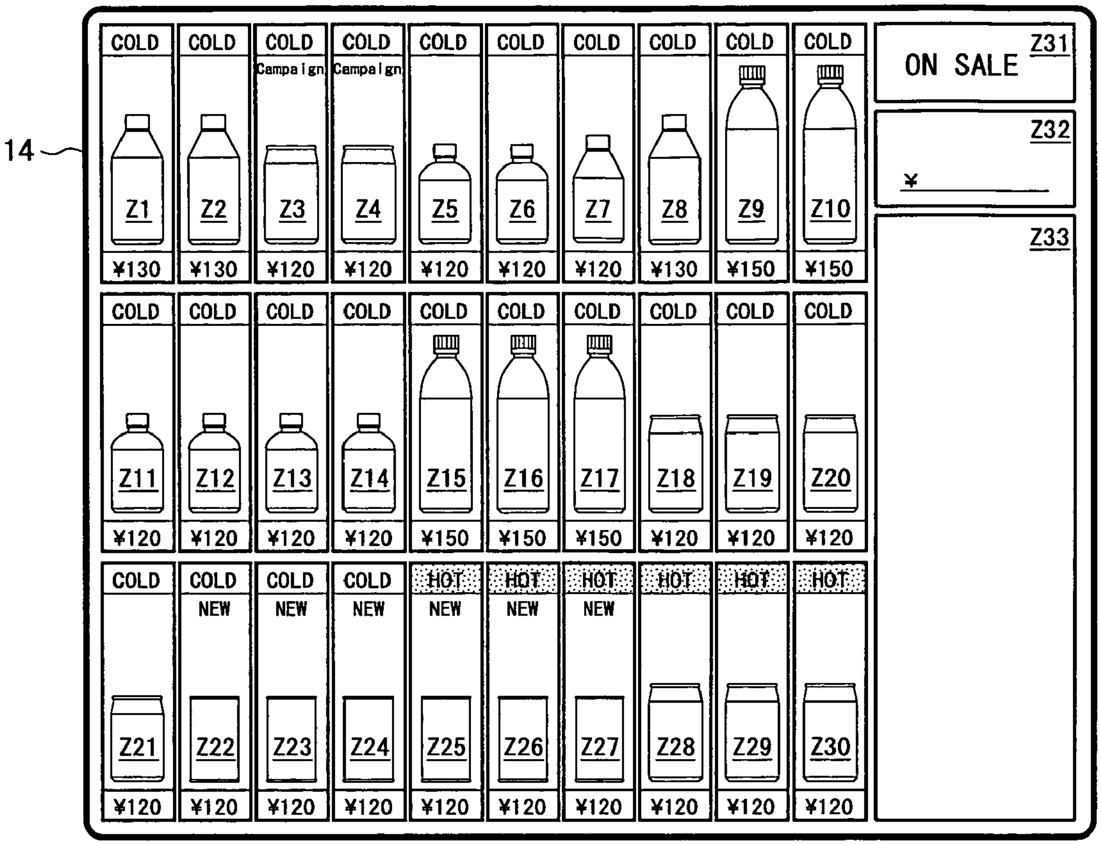
FIG. 5 shows a sales image before selecting a commodity.
Figure 6:
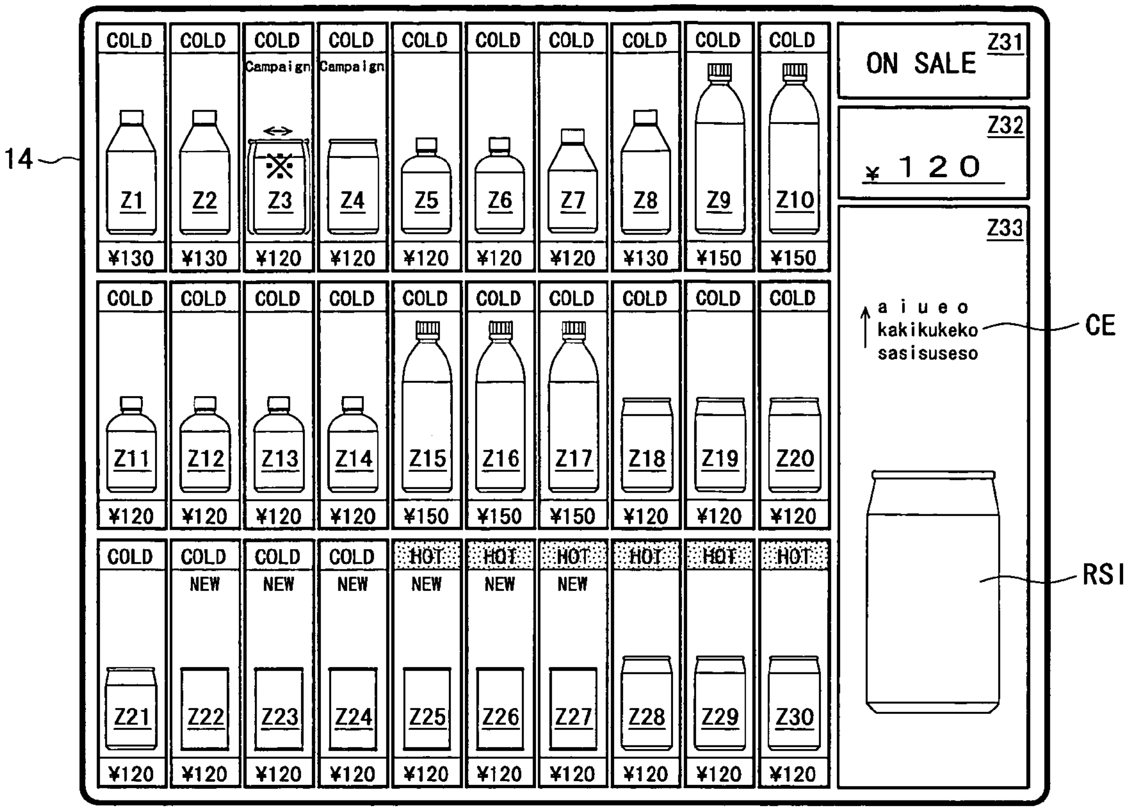
FIG. 6 shows the sales image after selecting a commodity.

Next, a commodity sales operation by the vending machine shown in FIGS. 1 and 2 is explained by referring to FIGS. 4 to 6.

On a sales image shown in FIG. 5, a number of commodity image display areas Z1 to Z30 for scale-down commodity images, etc. indicating dispensable commodities, an operation status display area Z31 for display of "on sale" or "in preparatory stage" of an operation status of the vending machine, an insert amount display area Z32 for display of an amount inserted through the coin insert slot 16 and the banknote insert slot 18, and a commodity information display area Z33 for display of a full-scale commodity image and a commodity explanation are set with the layout shown in FIG. 5. The display layout of the sales image is not limited to that shown in FIG. 5. Shapes, numbers, and arrangements of the commodity image display areas Z1 to Z30 can be arbitrarily changed as necessary.

In the commodity image display areas Z1 to Z30, a scale-down commodity image obtained by similarity-reducing an full-scale commodity image into 70 to 30% which indicates a recognizable size is displayed in the center. Below the scale-down commodity image, each commodity price is displayed. Above the scale-down commodity image, the thermoregulation characters COLD or HOT indicating a cooling status or a warming status of the each commodity are displayed. When the thermoregulation characters are COLD, the thermoregulation characters or a background color is shown in cold colors such as blue, etc. When the thermoregulation characters are HOT, a thermoregulation characters or a background color is shown in warm colors such as red, etc. Between the scale-down commodity image and the thermoregulation character, an icon of new commodity, a campaign, etc. can be displayed by optional settings. In the display area of a commodity price, the characters of "under cooling" or "under warming" can be displayed in place of the commodity price when the corresponding commodities are being cooled or warmed.

The commodity image display areas Z1 to Z30 according to the present embodiment correspond to the term "commodity image" used in the scope of the claims, and the term "commodity image" includes not only scale-down commodity image displayed in the commodity image display area but also supplementary data such as the commodity price, the thermoregulation character, icon, etc. displayed together with the scale-down commodity image.

The flow of display settings of the commodity image display areas Z1 to Z30 is briefly described below. First, the commodities are stored in the storage path **2*b* of the each commodity storage rack 2. Then, commodity codes corresponding to the stored commodities are input by a remote controller which can be connected to the first control unit 23 or a handy terminal which can be communicated by wireless with the first control unit 23, and an operation of assigning the commodity codes to each of the commodity image display areas Z1 to Z30 is performed. Since the commodity images corresponding to each commodity code are stored in advance in the second control unit 24, predetermined scale-down commodity images and the commodity prices are displayed in each of the commodity image display areas Z1 to Z30 when the commodity codes are input. The thermoregulation characters are displayed based on the contents set by the thermoregulation setting unit 31**. When the icons of a new commodity, a campaign, etc. are displayed, a predetermined icon is selected from a prepared icons group, and the commodity image display area in which the icon is to be displayed is selected.

When the sales image is displayed, it is determined whether or not commodity have been selected, that is, whether or not a finger has touched any of the commodity image display areas Z1 to Z30 and one of the commodity image display areas Z1 to Z30 has been specified in the basis of the signal from the touch sensor 34 (step S1 shown in FIG. 4).

When the commodity is selected, for example, when the commodity displayed in the commodity image display area Z3 is specified, an effective sound is generated simultaneously when the scale-down commodity image in the area Z3 is slightly moved horizontally or vertically as shown in FIG. 6, and the selection of the commodity is appealed to the eyes and ears of the purchaser (step S2 shown in FIG. 4). When the commodity is selected, the full-scale commodity image RSI of the selected commodity is displayed on the commodity information display area Z33 as shown in FIG. 6 so that the commodity can be appealed to the purchaser, and the explanation CE of the selected commodity, for example, a quantity, a amount of calories, effects, etc. of the selected commodity are displayed by vertical scroll, horizontal scroll, or still state so that the commodity can be further appealed (step S3 shown in FIG. 4).

Furthermore, when the commodity is selected, it is judged whether or not the insert amount is equal to or larger than the commodity price (step S4 shown in FIG. 4). When the commodity selecting operation is performed in the status in which no coins and no banknote are insert or the insert amount is short of the commodity price, the processes in the steps S2 and S3 are repeated.

When the insert amount is short of the commodity price, a message such as "The insert amount is short." can be displayed as necessary until the insert amount reaches the commodity price by vertical scroll, horizontal scroll, or still state.

When the insert amount exceeds the commodity price in the processes in the steps S1 to S4, the frame of the commodity image display area indicating the scale-down commodity image of the dispensable commodity or the price of commodity are blinked or changed in display color so that the dispensable commodity by the current insert amount can be easily confirmed by eyes. Otherwise, it is desired that the scale-down commodity images of dispensable commodities are emphasized to discriminate the dispensable commodities from the non-dispensable commodities.

When the commodity is selected in a status in which the insert amount is equal to or larger than the commodity price, the vent mechanism 2*c* of the commodity storage rack 2 storing the selected commodity is operated to deliver the selected commodity (step S5 shown in FIG. 4).

Figure 7:
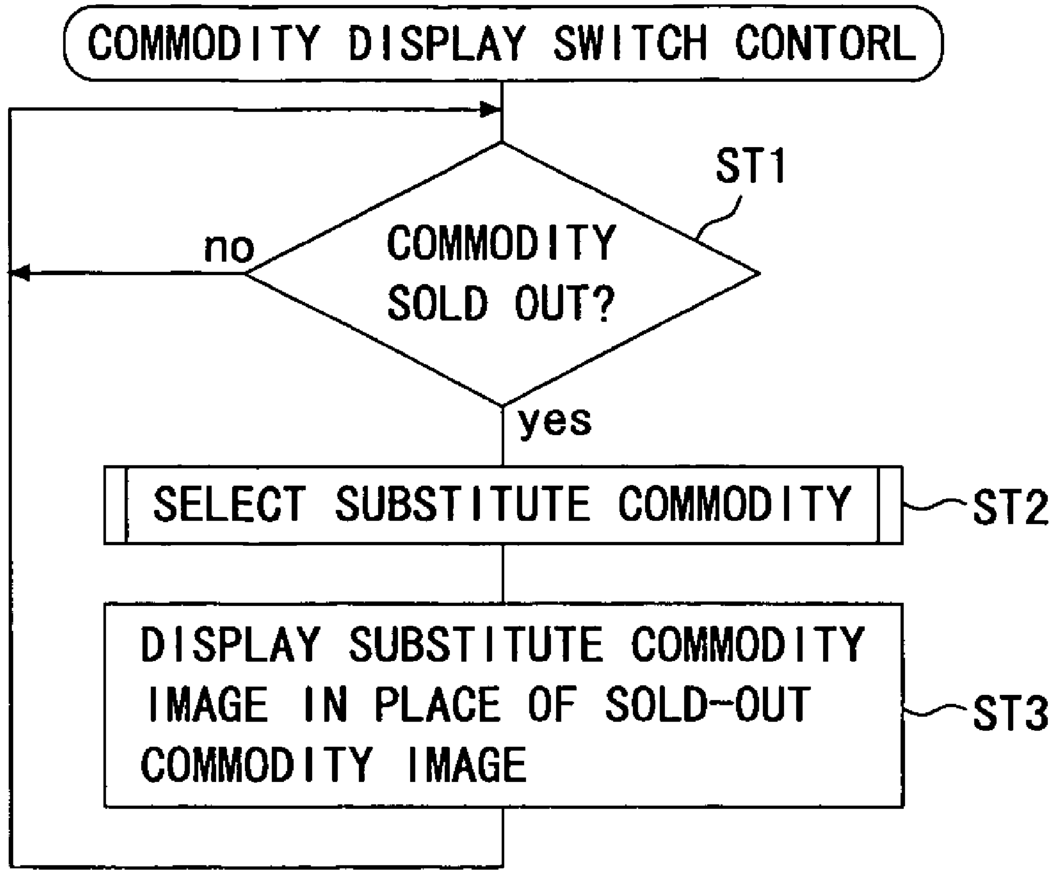
FIG. 7 is a flowchart of switching a display when a commodity is sold out in the vending machine shown in FIGS. 1 and 2.
Figure 8:
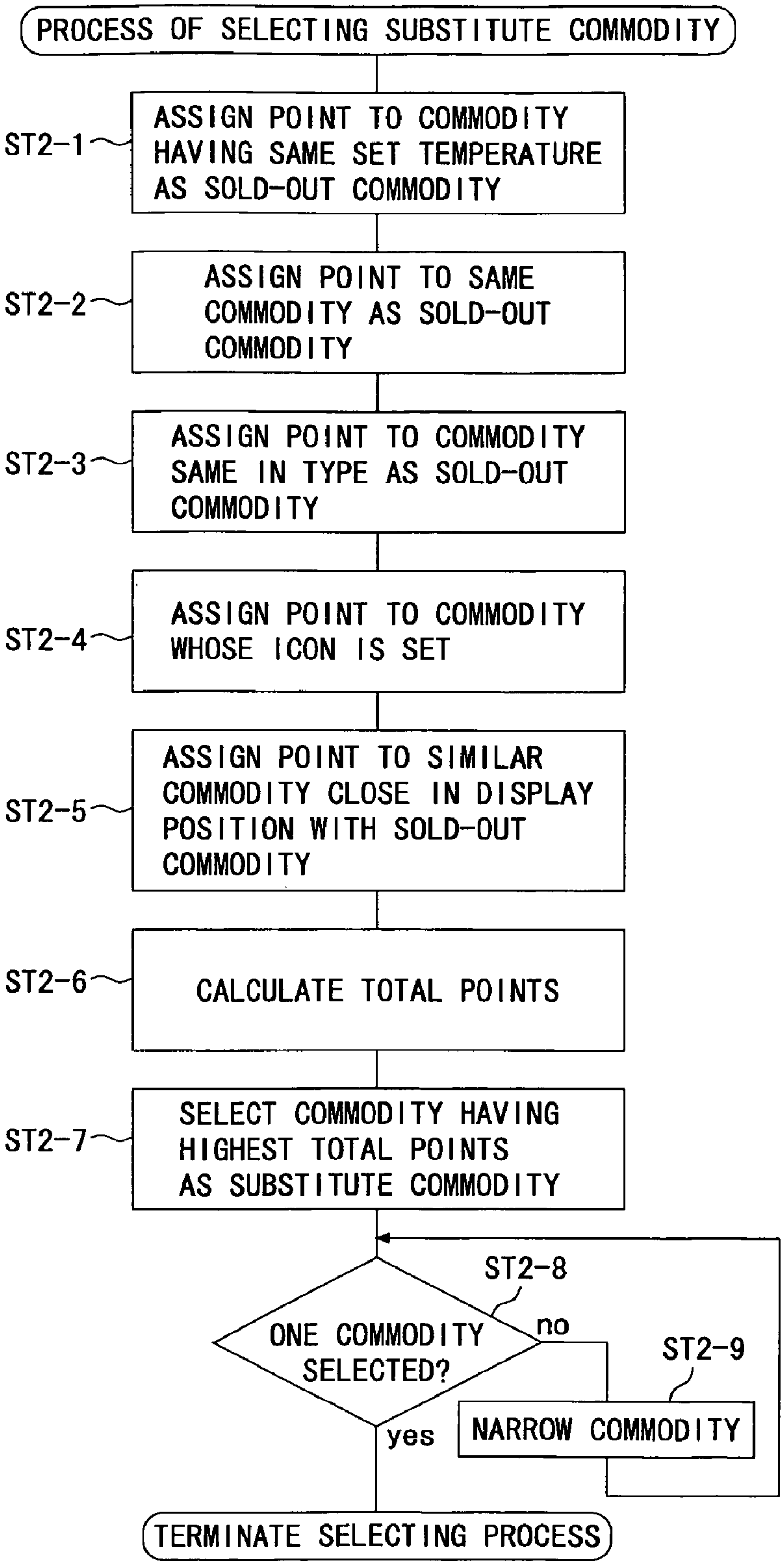
FIG. 8 is a flowchart of switching the display when commodity is sold out in the vending machine shown in FIGS. 1 and 2.
Figure 9:
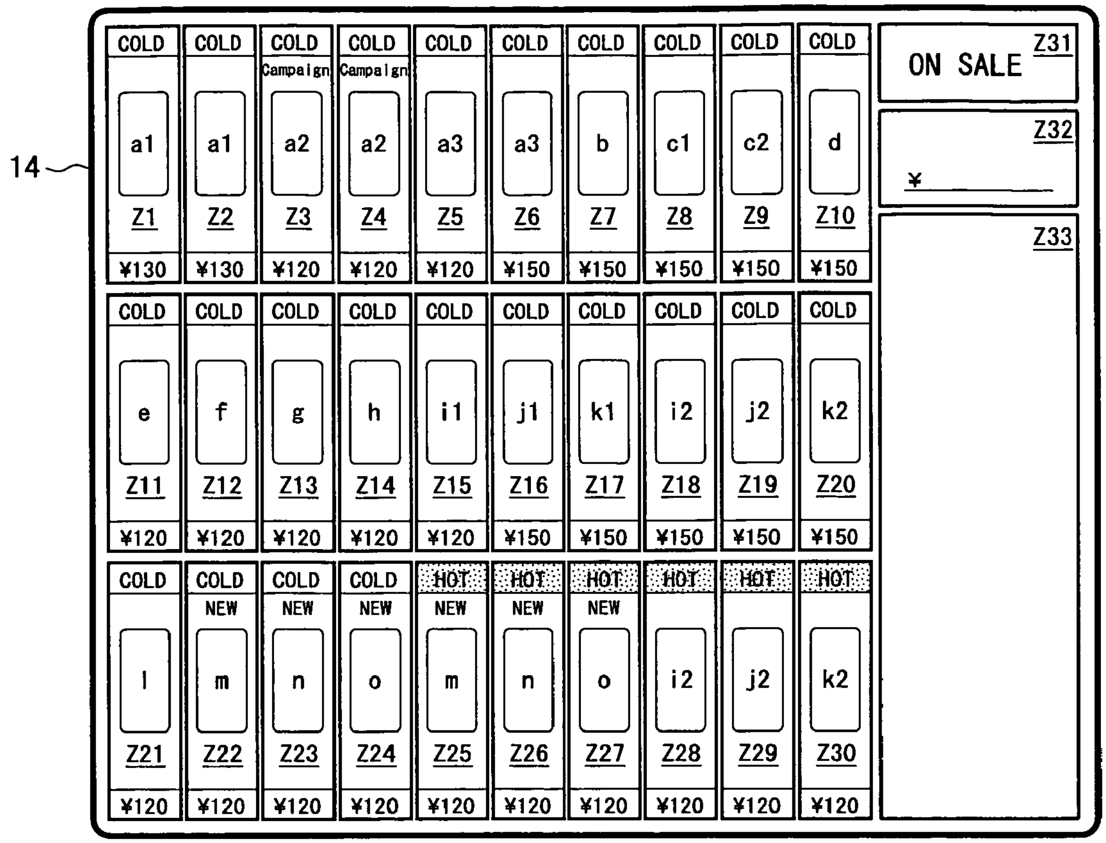
FIG. 9 shows a reference view for explanation of switching the display.

Next, a process of switching a display when a commodity is sold out with the vending machine shown in FIGS. 1 and 2 is explained by referring to FIGS. 7 to 9.

When any one of the commodities corresponding to the commodity images displayed in the commodity image display areas Z1 to Z30 is sold out during the operation of the vending machine, a commodity display switching control in the steps ST1 to ST3 shown in FIG. 7 is performed. Practically, a substitute commodity for the sold-out commodity is selected from among the commodities other than the sold-out commodity, and the display in the commodity image display area including the commodity image of the sold-out commodity is replaced with a display of a commodity image display area including a commodity image of a selected substitute commodity.

That the commodity corresponding to the commodity image displayed in the commodity image display areas Z1 to Z30 can be known according to the detection signal of the sold-out detection sensor 2*d* for detecting the presence/absence of the commodity C in the storage path 2*b* of the each commodity storage rack 2.

The process of selecting the substitute commodity in the step ST2 shown in FIG. 7 is performed basically in the method of selecting as the substitute commodity a commodity having the highest total points after performing plural times under different conditions the weighting process of assigning a point to the commodity extracted under a predetermined retrieval condition from among the commodities other than the sold-out commodity as described in steps ST2-1 to ST2-7 shown in FIG. 8.

The flow of the process of selecting the substitute commodity shown in FIG. 8 is described below by referring to FIG. 9.

FIG. 9 is based on the sales image shown in FIG. 5, and the alphabetical characters "a" to "o" shown in FIG. 9 indicate each commodity names (hereinafter used also as characters indicating commodity), and numbers "1" to "3" after the alphabetical characters indicate a difference in shape of container. The set temperatures for the commodities "a1", "a2", "a3", "b", "c1", "c2", "d"~"h", "i1", "j1", "k1", "i2", "j2", "k2" and "l"~"o" displayed in the commodity image display areas Z1 to Z24 are cooling temperatures, and the set temperatures for the commodities "m"~"o", "i2", "j2" and "k2" displayed in the commodity image display areas Z25 to Z30 are warming temperatures.

In the commodities "a"~"o" displayed in the commodity image display areas Z1 to Z30, the commodity "a1", "a2", "a3" and "e"~"h" displayed in the commodity image display areas Z1 to Z6 and Z11 to Z14 belong to a carbonate-type beverage. The commodities "b" and "d" indicated in the areas Z7 and Z10 belong to a juice-type beverage. The commodities "c1" and "c2" displayed in the areas Z8 and Z9 belong to a sporting beverage. The commodities "i1", "j1", "k1", "i2", "j2" and "k2" displayed in the areas Z15 to Z20 and Z28 to Z29 belong to a tea-type beverage. The commodities "l"~"o" displayed in the areas Z21 to Z27 belong to a coffee-type beverage.

In the following three practical examples of selecting processes; the commodities, which are in the same temperature state as the sold-out commodity, are assigned the point $2^5=32$; the commodities, which are the same as the sold-out commodities, are assigned the point $2^4=16$; the commodities, which belong to the same type as the sold-out commodity, are assigned the point $2^3=8$; the commodities, for which icons are set, are assigned the point $2^2=4$; the commodities, which are similar (same type) to the sold-out commodity and have close display positions to the sold-out commodity, are assigned the point $2^1=2$; thereby performing the weighting process.

The reason why the weighting point is $2^n$ is that although there are the commodity matching a plurality of low-point conditions, the commodity matching a single high-point condition is to be selected as the substitute commodity. For example, the weighting point of the commodity matching a highest-point single condition (32 points) is higher than the weighting point of the commodity matching all lower-point conditions (16+8+4+2=30 points), therefore the latter commodity is not selected as the substitute commodity.

PRACTICAL EXAMPLE 1 OF THE SELECTING PROCESS

When the commodity "b" displayed in the area Z7 on the sales image during the operation of the vending machine, that is, the commodity "b" belonging to the juice-type beverage whose set temperature is the cooling temperature, is sold out, the commodities having the same set temperature as the sold-out commodity "b" are retrieved from among the commodities other than the sold-out commodity. In this retrieval, since the commodities "a1", "a2", "a3", "c1", "c2", "d"~"h", "i1", "j1", "k1", "i2", "j2", "k2" and "l"~"o" displayed in the areas Z1 to Z6 and Z8 to Z24 are extracted, these commodities are assigned the point 32 (step ST2-1 shown in FIG. 8).

Then, the commodities that are the same as the sold-out commodity "b", that is, the commodities having the same name and the container shape as the commodity "b", are retrieved from among the commodities other than the sold-out commodity. Since no corresponding commodities are detected in this retrieval, no point is assigned (step ST2-2 shown in FIG. 8).

Then, the commodities belonging to the same type as the sold-out commodity "b" are retrieved from among the commodities other than the sold-out commodity. Since the commodity "d" displayed in the area Z10 is extracted in this retrieval, this commodity are assigned the point 8 (step ST2-3 shown in FIG. 8).

Then, the commodities having the icons of the new commodity, the campaigns, etc. are set are retrieved from among the commodities other than the sold-out commodity. Since the commodities "a2" and "m"~"o" displayed in the areas Z3, Z4 and Z22 to Z27 are extracted in this retrieval, these commodities are assigned the point 4 (step ST2-4 shown in FIG. 8).

Then, the similar commodities (the same type commodities) that are close in display position are retrieved from among the commodities other than the sold-out commodity. Since the commodity "d" displayed in the area Z10 which is one horizontal row is extracted in this retrieval, the commodity is assigned the point 2 (step ST2-5 shown in FIG. 8).

Then, the total points of the respective commodity extracted and assigned points are calculated (step ST2-6 shown in FIG. 8). According to the points assigned as described above, since the highest total points (32+8+2=42) is assigned to the commodity "d" displayed in the area Z10, this commodity "d" is selected as the substitute commodity (step ST2-7 shown in FIG. 8).

In this example, since the substitute commodity selected in step ST2-7 is only one, the series of the selecting process terminates (step ST2-8 shown in FIG. 8).

PRACTICAL EXAMPLE 2 OF THE SELECTING PROCESS

When the commodity "f" displayed in the area Z12 on the sales image during the operation of the vending machine, that is, the commodity "f" belonging to the carbonate-type beverage whose set temperature is cooling temperature, is sold out, the commodities having the same set temperature as the sold-out commodity "f" are retrieved from among the commodities other than the sold-out commodity. In this retrieval, since the commodities "a1", "a2", "a3", "b", "c1", "c2", "d", "e", "g", "h", "i1", "j1", "k1", "i2", "j2", "k2" and "l"~"o" displayed in the areas Z1 to Z11 and Z13 to Z24 are extracted, these commodities are assigned the point 32 (step ST2-1 shown in FIG. 8).

Then, the commodities that are the same as the sold-out commodity "f", that is, the commodities having the same name and the container shape as the commodity "f", are retrieved from among the commodities other than the sold-out commodity. Since no corresponding commodities are detected in this retrieval, no point is assigned (step ST2-2 shown in FIG. 8).

Then, the commodities belonging to the same type as the sold-out commodity "f" are retrieved from among the commodities other than the sold-out commodity. Since the commodities "a1", "a2", "a3", "e", "g" and "h" displayed in the areas Z1 to Z6, Z11, Z13 and Z14 are extracted in this retrieval, these commodities are assigned the point 8 (step ST2-3 shown in FIG. 8).

Then, the commodities having the icons of the new commodity, the campaigns, etc. are set are retrieved from among the commodities other than the sold-out commodity. Since the commodities "a2" and "m"~"o" displayed in the areas Z3, Z4 and Z22 to Z27 are extracted in this retrieval, these commodities are assigned the point 4 (step ST2-4 shown in FIG. 8).

Then, the similar commodities (the same type commodities) that are close in display position are retrieved from among the commodities other than the sold-out commodity. Since the commodities "e", "g" and "h" displayed in the areas "Z11", "Z13" and "Z14" which are one horizontal rows are extracted in this retrieval, these commodities are assigned the point 2 (step ST2-5 shown in FIG. 8).

Then, the total points of the respective commodity extracted and assigned points are calculated (step ST2-6 shown in FIG. 8). According to the points assigned as described above, since the highest total points (32+8+4=44) is assigned to the commodity "a2" displayed in the areas Z3 and Z4, the commodity "a2" is selected as the substitute commodity (step ST2-7 shown in FIG. 8).

In this example, since the substitute commodity selected in step ST2-7 is only one, the series of the selecting process terminates (step ST2-8 shown in FIG. 8).

PRACTICAL EXAMPLE 3 OF THE SELECTING PROCESS

When the commodity "k2" displayed in the area Z30 on the sales image during the operation of the vending machine, that is, the commodity "k2" belonging to the tea-type beverage whose set temperature is warming temperature, is sold out, the commodities having the same set temperature as the sold-out commodity "k2" are retrieved from among the commodities other than the sold-out commodity. In this retrieval, since the commodities "m"~"o", "i2" and "j2" displayed in the areas Z25 to Z29 are extracted, these commodities are assigned the point 32 (step ST2-1 shown in FIG. 8).

Then, the commodities that are the same as the sold-out commodity "k2", that is, the commodities having the same name and the container shape as the commodity "k2", are retrieved from among the commodities other than the sold-out commodity. Since the commodity "k2" displayed in the area Z20 is extracted in this retrieval, the commodity are assigned the point 16 (step ST2-2 shown in FIG. 8).

Then, the commodities belonging to the same type as the sold-out commodity "k2" are retrieved from among the commodities other than the sold-out commodity. Since the commodities "i1", "j1", "k1", "i2", "j2" and "k2" displayed in the area Z15 to Z20, Z28 and Z29 are extracted in this retrieval, these commodities are assigned the point 8 (step ST2-3 shown in FIG. 8).

Then, the commodities having the icons of the new commodity, the campaigns, etc. are set are retrieved from among the commodities other than the sold-out commodity. Since the commodities "a2" and "m"~"o" displayed in the areas Z3, Z4 and Z22 to Z27 are extracted in this retrieval, these commodities are assigned the point 4 (step ST2-4 shown in FIG. 8).

Then, the similar commodities (the same type commodities) that are close in display position are retrieved from among the commodities other than the sold-out commodity. Since the commodities "i2" and "j2" displayed in the areas Z28 and Z29 which are one horizontal row are extracted in this retrieval, these commodities are assigned the point 2 (step ST2-5 shown in FIG. 8).

Then, the total points of the respective commodity extracted and assigned points are calculated (step ST2-6 shown in FIG. 8). According to the points assigned as described above, since the highest total point (32+8+2=42) is assigned to the commodities "i2" and "j2" displayed in the areas Z28 and Z29, the commodities "i2" and "j2" are selected as the substitute commodity (step ST2-7 shown in FIG. 8).

In this example, since the substitute commodity selected in step ST2-7 are two, these commodities are narrowed until only one remains (steps ST2-8 and ST2-9 shown in FIG. 8), thereby terminating the series of selecting process.

As the narrowing method, a method of narrowing the commodity using a priority condition stored in advance can be used, for example, a method prioritizing the commodity "j2" displayed in the area Z29 as the substitute commodity which is positioned in the same horizontal row as the area Z30 indicating the sold-out commodity "k2" and has an area number close to the area number Z30, and a method of prioritizing the commodity "i2" displayed in the area Z28 as the substitute commodity that its sale is promoted based on a prepared request data of a beverage manufacturer.

In the above-mentioned three practical examples of the selecting process, the condition of assigning the point 2 is the similar commodity (the same type commodity) close in display position. However, this condition may be changed to a condition which a commodity in the same horizontal row as the sold-out commodity is selected as the substitute commodity. In this case, for example, when the sold-out commodity is the commodity "b", the commodities "a1", "a2", "a3", "c1", "c2" and "d" displayed in the same horizontal row as the area Z7 displaying the sold-out commodity "b" are assigned the point 2.

In the above-mentioned three practical examples of the selecting process, the weighting process is performed in order from the most important retrieval condition, but a similar result can be obtained by changing the order in which the weighting process is performed.

Furthermore, in the above-mentioned three practical examples of the selecting process, the points 32, 16, 8, 4 and 2 are assigned depending on the importance of the each retrieval condition. However, it is not always necessary to assign the point as the power of two, and a different commodity can be selected as the substitute commodity by changing an importance and an assigned point of the each retrieval condition.

Thus, with the above-mentioned vending machine, when any one of commodities corresponding to the commodity images displayed in the commodity image display areas Z1 to Z30 is sold out during the operation of the vending machine, the substitute commodity for the sold-out commodity is selected from among the commodities other than the sold-out commodity, and the display in the commodity image display area including the commodity image of the sold-out commodity is replaced with the display of the commodity image display area including the commodity image of the selected substitute commodity. Therefore, the commodity image display area including the commodity image is not cleared as if it were lost and therefore the purchaser can be protected from receiving a bad impression when the purchaser sees the display, and the problem of lowering the appetite for shopping because there are a smaller number of displayed commodity image display areas each including the commodity image can be solved.

Since the substitute commodity is selected as its having the highest total point after performing plural times under different conditions the weighting process of assigning the point to the commodity extracted under the predetermined retrieval condition from among the commodities other than the sold-out commodity, the optimum commodity as the substitute commodity can be selected and this commodity image can be displayed, thereby enhancing the salability of the vending machine.

Although two or more commodities are selected as the substitute commodity as a result of performing plural times the weighting process under different conditions, they are narrowed until only one under the predetermined priority condition. Therefore, there is no problem in selecting the substitute commodity.

Furthermore, a different commodity can be selected as the substitute commodity by changing the importance of the retrieval condition in the each weighting process to change the assigned point.

The desired embodiments described in this specification are only for examples and do not intend to limit the present invention. The scope of the present invention is defined in the claims. All variations included in the gist of the claims will be included in the present invention.

What is claimed is:

1. A vending machine, comprising:

an image display;

commodity image display means for displaying on the image display a plurality of commodity images indicating dispensable commodities;

commodity image replacement means for replacing one of the commodity images corresponding to a sold-out commodity with a commodity image of a substitute commodity when one of the dispensable commodities is sold out; and substitute commodity selection means for performing plural times under different conditions a weighting process of assigning a point to commodity extracted under a predetermined retrieval condition from among the commodities other than the sold-out commodity, and selecting a commodity having a highest total points as the substitute commodity.

2. The vending machine according to claim 1, wherein the substitute commodity selection means comprises narrowing means for narrowing until only one under a predetermined priority condition when there are two or more commodities having a equal total points.

3. The vending machine according to claim 2, wherein a point assigned in each weighting process is set depending on importance of a retrieval condition.

4. The vending machine according to claim 3, wherein the weighting process includes:

a process of assigning a point to the commodities extracted by retrieving commodities having the same set temperature as the sold-out commodity from among the commodities other than the sold-out commodity;

a process of assigning a point to the commodities extracted by retrieving the same commodities as the sold-out commodity from among the commodities other than the sold-out commodity;

a process of assigning a point to the commodities extracted by retrieving the same type commodities as the sold-out commodity from among the commodities other than the sold-out commodity; and a process of assigning a point to the commodities extracted by retrieving new commodities and commodities of a campaign from among the commodities other than the sold-out commodity.

5. The vending machine according to claim 2, wherein the weighting process includes:

a process of assigning a point to the commodities extracted by retrieving commodities having the same set temperature as the sold-out commodity from among the commodities other than the sold-out commodity;

a process of assigning a point to the commodities extracted by retrieving the same commodities as the sold-out commodity from among the commodities other than the sold-out commodity;

a process of assigning a point to the commodities extracted by retrieving the same type commodities as the sold-out commodity from among the commodities other than the sold-out commodity; and a process of assigning a point to the commodities extracted by retrieving new commodities and commodities of a campaign from among the commodities other than the sold-out commodity.

6. The vending machine according to claim 1, wherein a point assigned in each weighting process is set depending on importance of a retrieval condition.

7. The vending machine according to claim 6, wherein the weighting process includes:

a process of assigning a point to the commodities extracted by retrieving commodities having the same set temperature as the sold-out commodity from among the commodities other than the sold-out commodity;

a process of assigning a point to the commodities extracted by retrieving the same commodities as the sold-out commodity from among the commodities other than the sold-out commodity;

a process of assigning a point to the commodities extracted by retrieving the same type commodities as the sold-out commodity from among the commodities other than the sold-out commodity; and a process of assigning a point to the commodities extracted by retrieving new commodities and commodities of a campaign from among the commodities other than the sold-out commodity.

8. The vending machine according to claim 1, wherein the weighting process includes:

a process of assigning a point to the commodities extracted by retrieving commodities having the same set temperature as the sold-out commodity from among the commodities other than the sold-out commodity;

a process of assigning a point to the commodities extracted by retrieving the same commodities as the sold-out commodity from among the commodities other than the sold-out commodity;

a process of assigning a point to the commodities extracted by retrieving the same type commodities as the sold-out commodity from among the commodities other than the sold-out commodity; and a process of assigning a point to the commodities extracted by retrieving new commodities and commodities of a campaign from among the commodities other than the sold-out commodity.

* * * * *